(12) United States Patent
Koduri et al.

(10) Patent No.: US 8,217,950 B2
(45) Date of Patent: Jul. 10, 2012

(54) VIDEO PROCESSING ACROSS MULTIPLE GRAPHICS PROCESSING UNITS

(75) Inventors: Rajabali M. Koduri, Santa Clara, CA (US); David Gotwalt, Winter Springs, FL (US); Andrew Pomianowski, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 145 days.

(21) Appl. No.: 12/552,759

(22) Filed: Sep. 2, 2009

(65) Prior Publication Data

US 2010/0053176 A1    Mar. 4, 2010

Related U.S. Application Data

(63) Continuation-in-part of application No. 11/140,156, filed on May 27, 2005.

(51) Int. Cl.
*G06F 15/16* (2006.01)

(52) U.S. Cl. ........ 345/502; 345/501; 345/503; 345/504; 345/505; 345/506

(58) Field of Classification Search .......... None
See application file for complete search history.

(56) References Cited

U.S. PATENT DOCUMENTS

| | | | |
|---|---|---|---|
| 6,266,072 B1 * | 7/2001 | Koga et al. | 345/505 |
| 6,359,624 B1 | 3/2002 | Kunimatsu | |
| 6,720,975 B1 * | 4/2004 | Dietrich, Jr. | 345/611 |
| 2003/0140076 A1 * | 7/2003 | Luick et al. | 708/490 |
| 2005/0184995 A1 * | 8/2005 | Lefebvre et al. | 345/506 |
| 2007/0279411 A1 * | 12/2007 | Bakalash et al. | 345/419 |
| 2008/0094403 A1 | 4/2008 | Bakalash et al. | |

FOREIGN PATENT DOCUMENTS

WO    WO 2006/126093 A2    11/2006

OTHER PUBLICATIONS

International Search Report and Written Opinion for International Application No. PCT/US2010/047674, mailed on Dec. 14, 2010, 9 pages.

* cited by examiner

*Primary Examiner* — Kee M Tung
*Assistant Examiner* — Jwalant Amin
(74) *Attorney, Agent, or Firm* — Sterne, Kessler, Goldstein & Fox P.L.L.C.

(57) ABSTRACT

A processing unit, method, and graphics processing system are provided for processing a plurality of frames of graphics data. For instance, the processing unit can include a first plurality of graphics processing units (GPUs), a second plurality of GPUs, and a plurality of compositors. The first plurality of GPUs can be configured to process a first frame of graphics data. Likewise, the second plurality of GPUs can be configured to process a second frame of graphics data. Further, each compositor in the plurality of compositors can be coupled to a respective GPU from the first and second pluralities of GPUs, where the plurality of compositors is configured to sequentially pass the first and second frames of graphics data to a display module.

22 Claims, 7 Drawing Sheets

VIDEO PROCESSING ACROSS MULTIPLE GRAPHICS PROCESSING UNITS

CROSS REFERENCE TO RELATED APPLICATION

This application is a continuation-in-part application of pending U.S. patent application entitled "Antialiasing System and Method," Ser. No. 11/140,156, filed May 27, 2005, which is incorporated herein by reference in its entirety.

BACKGROUND

1. Field

Embodiments of the present invention generally relate to graphics and video processing. More specifically, embodiments of the present invention refer to antialiasing and alternate frame rendering across multiple graphics processing units.

2. Background

Graphics and video processing hardware and software continue to become more advance each year. Graphics and video processing circuitry is typically present on add-on cards in a computer system, but can also be found on the motherboard itself. The graphics processor is responsible for creating graphics displayed by a monitor of the computer system. In early text-based personal computers, the display of graphics on a monitor was a relatively simple task. However, as the complexity of modern graphics-capable operating systems has dramatically increased due to the amount of information to be displayed, it is now impractical for graphics processing to be handled by the main processor or central processing unit of the computer system. As a result, the display of graphics is now handled by increasingly-intelligent graphics cards, which include specialized co-processors referred to as graphics processing units (GPUs) or video processing units (VPUs).

Various aspects of video processing typically require a trade-off between quality and performance. One example of this trade-off involves correction for aliasing, which is typically referred to as anti-aliasing (AA). AA refers to a minimization of artifacts, known as aliasing, when representing a high-resolution signal at a lower resolution. The graphics process of rendering draws one or more pixels to be displayed (e.g., on the monitor of the computer system).

Aliasing includes edge aliasing and surface aliasing. Edge aliasing creates stair steps in an edge of a display that should appear smooth. Surface aliasing includes flashing or "popping" of very thin polygons (also referred to as moiré patterns) in a display. Techniques for alleviating edge and surface aliasing effects include multisampling and supersampling. Multisampling addresses edge aliasing by creating multiple samples of pixels, which are used to generate intermediate points between pixels. These multiple samples are averaged to determine the displayed pixel color value. The displayed edge in the multisampled image has a softened stair step effect. Multisampling, however, does not address the effects of surface aliasing.

Supersampling addresses both the effects of edge aliasing and surface aliasing. However, supersampling is computationally more intensive than multisampling and thus rarely performed in consumer-level GPU systems. Pixel centers (as opposed to pixels) carry texture information in the supersampling process. In supersampling, each pixel is rendered multiple times to yield multiple color values, which are then averaged to give a final pixel color. As a result, the displayed image has a softened effect.

Multisampling and supersampling techniques can be a computationally-intensive process for the GPU system since these AA techniques are processed through a video processing pipeline of the GPU system multiple times to create offset samples with respect to pixels or pixel centers. As a result, GPU processing time is increased.

SUMMARY

An apparatus, method, and system are needed for antialiasing (AA) that alleviates both edge aliasing effects and surface aliasing effects, while minimizing the impact to processing time in a graphics processing system. Embodiments of the present invention include a processing unit that includes a first plurality of graphics processing units (GPUs), a second plurality of GPUs, and a plurality of compositors. The first plurality of GPUs is configured to process a first frame of graphics data. Similarly, the second plurality of GPUs is configured to process a second frame of graphics data. Further, each compositor in the plurality of compositors is coupled to a respective GPU from the first and second pluralities of GPUs, where the plurality of compositors are configured to pass the first and second frames of graphics data to a display module.

The first plurality of GPUs is configured to process the first frame of graphics data substantially in parallel as the second plurality of GPUs processes the second frame of graphics data, according to an embodiment of the present invention. In an embodiment, the first and second pluralities of GPUs are also configured to perform an antialiasing function on the first frame of graphics data and the second frame of graphics data, respectively. Further, the compositors corresponding to the first plurality of GPUs are configured to either combine an output from each GPU in the first plurality of GPUs or pass a respective GPU output from the first plurality of GPUs to another compositor for further processing. The compositors corresponding to the second plurality of GPUs are configured to either combine an output from each GPU in the second plurality of GPUs or pass a respective GPU output from the second plurality of GPUs to another compositor for further processing or display.

Embodiments of the present invention also include a method for processing a plurality of frames of graphics data. The method includes the following: processing a first frame of graphics data with a first plurality of graphics processing units (GPUs), where an antialiasing operation is performed on the first frame of graphics data; processing a second frame of graphics data with a second plurality of GPUs, where an antialiasing operation is performed on the second frame of graphics data; and, passing the first and second frames of graphics data to a display module with a plurality of compositors. In an embodiment, the first and second frames of graphics data are displayed in a sequential manner (e.g., first frame of graphics data displayed first, followed by the second frame of graphics data).

Embodiments of the present invention further include a graphics processing system. The graphics processing system includes the following: an application module; an application programming interface (API) configured to receive one or more commands from the application module; a driver module configured to translate the one or more commands received from the API into a native format; a processing unit configured to process a plurality of frames of graphics data based on the one or more commands translated by the driver module; and, a display module configured to receive a plurality of processed frames of graphics data from the processing unit. The processing unit includes the following: a first plurality of graphics processing units (GPUs) configured to process a first frame of graphics data; a second plurality of GPUs configured to process a second frame of graphics data; and, a plurality of compositors, each compositor coupled to a respective GPU from the first and second pluralities of GPUs.

Further features and advantages of the invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Thus, the operational behavior of embodiments of the present invention will be described with the understanding that modifications and variations of the embodiments are possible, given the level of detail presented herein.

A processing unit, method, and graphics processing system for antialiasing (AA) and alternate frame rendering (AFR), while minimizing the impact to processing time in the graphics processing system, are described herein. Embodiments of the present invention include applying multisampling techniques, supersampling techniques, and a combination of both multisampling and supersampling techniques, as well as improving performance of these AA techniques, in a system with a plurality of graphics processing units (GPUs) or video processing units (VPUs). As used herein, GPU and VPU are interchangeable terms.

Figure 1:
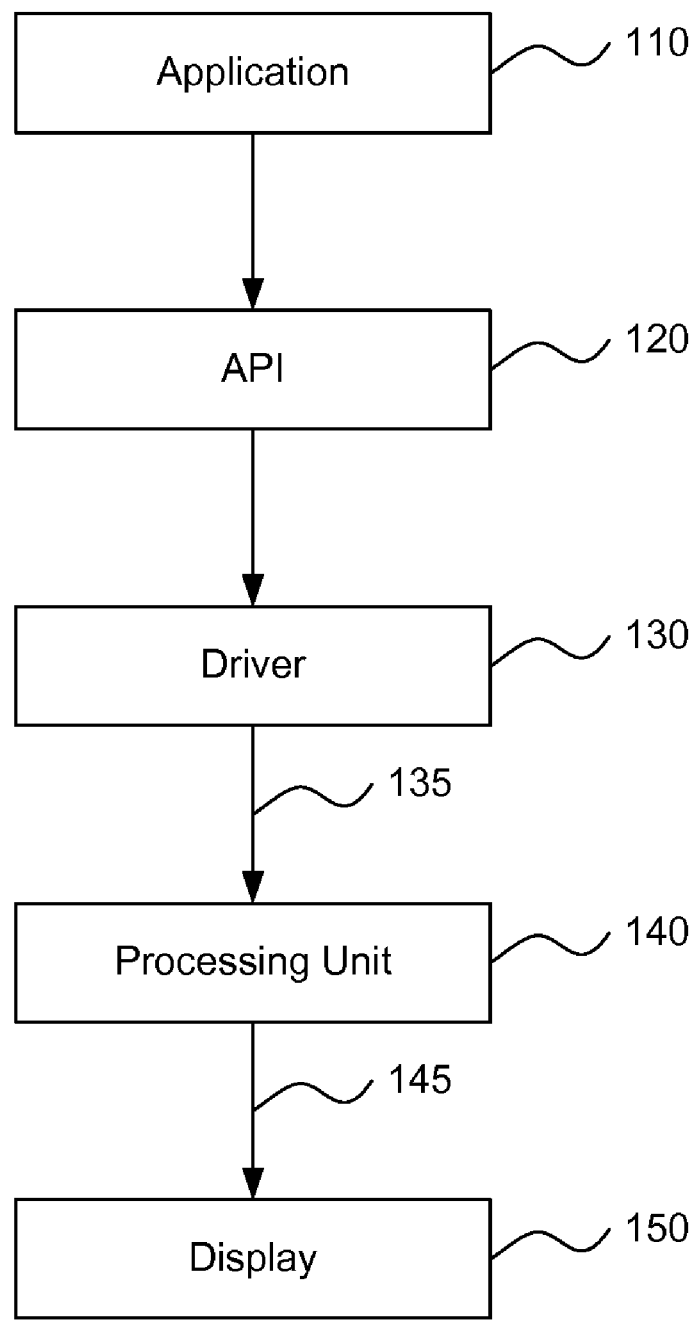
FIG. 1 is an illustration of a graphics processing system in which embodiments of the invention can be implemented.

FIG. 1 is an illustration of a graphics processing system 100 in which embodiments of the present invention can be implemented. Graphics processing system 100 includes an application module 110, an application programming interface (API) 120, a driver module 130, a processing unit 140, and a display module 150. In an embodiment, application module 110 is an end-user application that requires graphics processing such as, for example, a video game application. API 120 is configured to serve as an intermediary between application module 110 and driver module 130 according to an embodiment. In particular, API 120 allows a wide range of common graphics functions to be written by software developers such that the functions can operate on many different hardware systems (e.g., processing unit 140). Examples of API 120 include, but are not limited to, DirectX (from Microsoft) and OpenGL (from Silicon Graphics).

Driver module 130 is a computer program that allows a higher-level graphics computing program, from application module 110, to interact with processing unit 140 according to an embodiment of the present invention. For instance, driver module 130 can be written by a manufacturer of processing unit 140 and translate standard code received from API 120 into a native format understood by processing unit 140. Driver module 130 allows input from, for example, application module 110 or a user to direct settings of processing unit 140. Such settings include selection of multisampling factors, supersampling factors, or combinations thereof. For example, a user can select settings via a user interface (UI), including a UI supplied to the user with graphics processing hardware and software. Further details on these settings, according to embodiments of the present invention, can be found in U.S. patent application Ser. No. 11/140,156, titled "Antialiasing System and Method," which is incorporated by reference herein in its entirety.

Driver module 130 issues commands, via a driver output 135, to processing unit 140 according to an embodiment of the present invention. Processing unit 140 executes a series of commands for processing a plurality of frames of graphic data, including offsetting sample positions with respect to pixels and/or pixel centers in a programmable manner from sample positions received from or defined by API 120, according to an embodiment. In a further embodiment, driver module 130 programmably instructs processing unit 140 to multisample and/or supersample pixels and/or pixel centers by an AA factor. In an embodiment, processing unit 140 offsets samples with respect to the same pixels and/or pixel centers, but offsets them to different sample positions.

Display module 150 receives processed frames of graphics data, via a processing unit output 145, from processing unit 140 and displays the processed data to the end user, according to an embodiment of the present invention.

Figure 2:
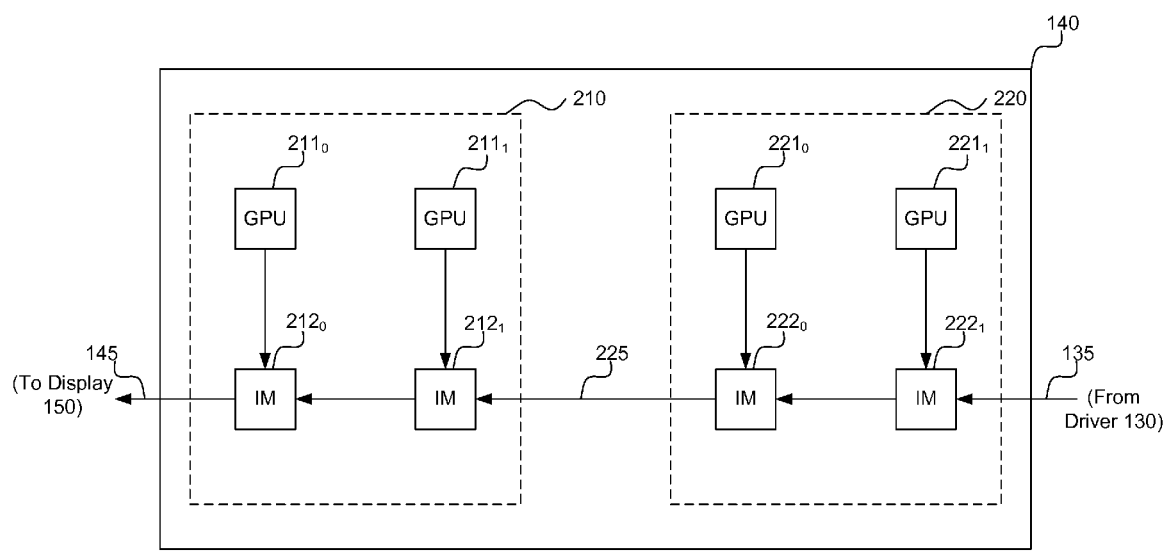
FIG. 2 is an illustration of an embodiment of a processing unit.

FIG. 2 is an illustration of an embodiment of processing unit 140. Processing unit 140 includes a first plurality of graphics processing units (GPUs) 210 and a second plurality of GPUs 220. The first plurality of GPUs 210 includes GPUs $211_0$ and $211_1$ and interlink modules (IMs) $212_0$ and $212_1$. Further, the second plurality of GPUs 220 includes GPUs $221_0$ and $221_1$ and IMs $222_0$ and $222_1$.

Processing unit 140 is configured to perform AA and alternate frame rendering (AFR) functions on a plurality of video data frames (also referred to herein as a plurality of frames of graphics data). AA refers to a minimization of distortion artifacts, known as aliasing, when representing a high-resolution signal at a lower resolution. For instance, antialiasing techniques removes signal components that have a higher frequency than is able to be properly resolved by a sampling device. AFR refers to a parallel graphics rendering technique, which can display an output of two or more GPUs to a single monitor, in order to improve rendering performance. AFR can be used in many graphics applications such as, for example, the generation of three-dimensional video sequences in real time.

Figure 3:
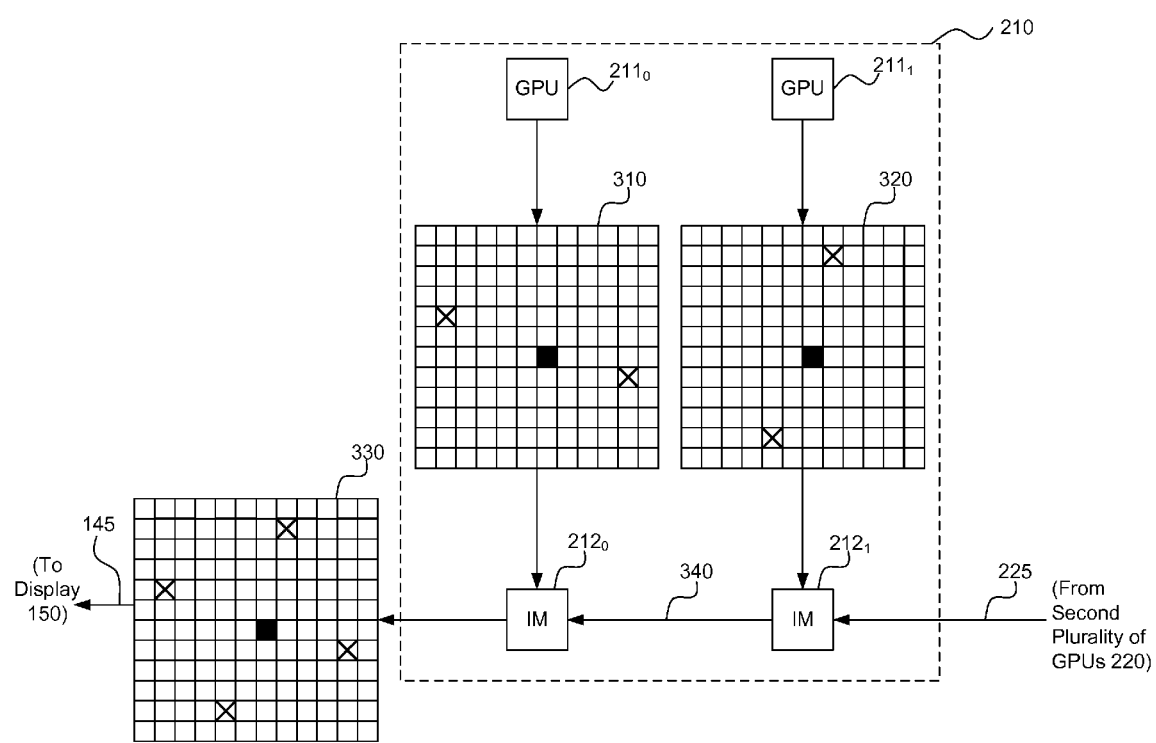
FIG. 3 is an illustration of an embodiment of a plurality of graphics processing units with example sampling pattern outputs.

In an embodiment, GPUs $211_0$ and $211_1$ from the first plurality of GPUs 210 each process video data according to instructions from a programmable driver (e.g., driver module 130 of FIG. 1). FIG. 3 is an illustration of the first plurality of GPUs 210 with an example sampling pattern output 310 from GPU $211_0$ and an example sampling pattern output 320 from GPU $211_1$. Example sampling patterns 310 and 320 are 12×12 grids that demonstrate 2× sampling. Based on the description herein, a person skilled in the relevant art will recognize that the 12×12 grids are used for example purposes and that other grid dimensions can be used with embodiments of the present invention. The darkened squares in sampling patterns 310 and 320 are pixel centers and the "X" notations represent pixel samples. The pixel samples are offset from an initial default location specified by an API (e.g., API 120 of FIG. 1). The offset locations are programmable in the programmable driver (e.g., driver module 130 of FIG. 1) and are specified in commands from the driver to GPUs $211_0$ and $211_1$. Further details on the processing of sampling patterns 310 and 320 by GPUs $211_0$ and $211_1$, respectively, can be found in U.S. patent application Ser. No. 11/140,156, titled "Antialiasing System and Method," which is incorporated by reference herein in its entirety.

Throughout the description, for convenience and explanation purposes, the sample pattern output by a GPU will also be referred to an output of the GPU. For example, in reference to FIG. 3, sampling pattern 310 is also referred to as output 310 of GPU $211_0$. Persons skilled in the relevant art will understand and appreciate that the sample pattern output by a GPU (also referred to herein as the output of GPUs $211_0$ and $211_1$) may not necessarily be the output to the display (e.g., display 150 of FIG. 1). That is, the sample pattern output by the GPU (or a portion thereof) can be used to generate a frame of graphics data, or portion thereof, that is ultimately output to the display, such as a liquid crystal display, a flat panel display, a cathode ray tube display, or other similar display devices. That is, the output sample pattern can be used as an input to a further portion of the GPU to generate the frame of graphics data (or a portion thereof) to a display according to an embodiment of the present invention.

In reference to FIG. 3, when GPUs $211_0$ and $211_1$ complete execution of commands for the frame of graphics data (also referred to herein as data frame and GPU output), the frame of graphics data is sent to IMs $212_0$ and $212_1$. The frame of graphics data from each of GPU $211_0$ and $211_1$ is either (1) merged in IMs $212_0$ and $212_1$ to generate a composite frame of graphics data 330 to be rendered to display 150 or (2) passed from one IM to another IM for further processing. In the frame of graphics data to be displayed, the AA sampling factor is effectively multiplied by the number of GPUs. For example, if each GPU performs 2× sampling on the same frame of graphics data, where each GPU samples different positions within the frame of graphics data (e.g., GPU $211_0$ performs 2× sampling on frame of graphics data 310, which contains the same data as frame of graphics data 320, at sampling positions different from the sampling positions of GPU $211_1$), the frame of graphics data to be displayed includes 4× sampling (e.g., composite frame of graphics data 330). In an embodiment of the present invention, driver module 130 of FIG. 1 is programmable to direct GPUs $211_0$ and $211_1$ to perform multisampling by a selectable multiplication factor, supersampling by a selectable multiplication factor, or a combination of multisampling by a selectable multiplication factor and supersampling by a selectable multiplication factor. Further details on multisampling and supersampling, with respect to the first plurality of GPUs 210 of FIG. 2 can be found in U.S. patent application Ser. No. 11/140,156, titled "Antialiasing System and Method," which is incorporated by reference herein in its entirety. As used herein, the terms combine, merge, composite, and mix all refer to the same capabilities of IMs $212_0$, $212_1$, $222_0$, and $222_1$ of FIG. 2.

Figure 4:
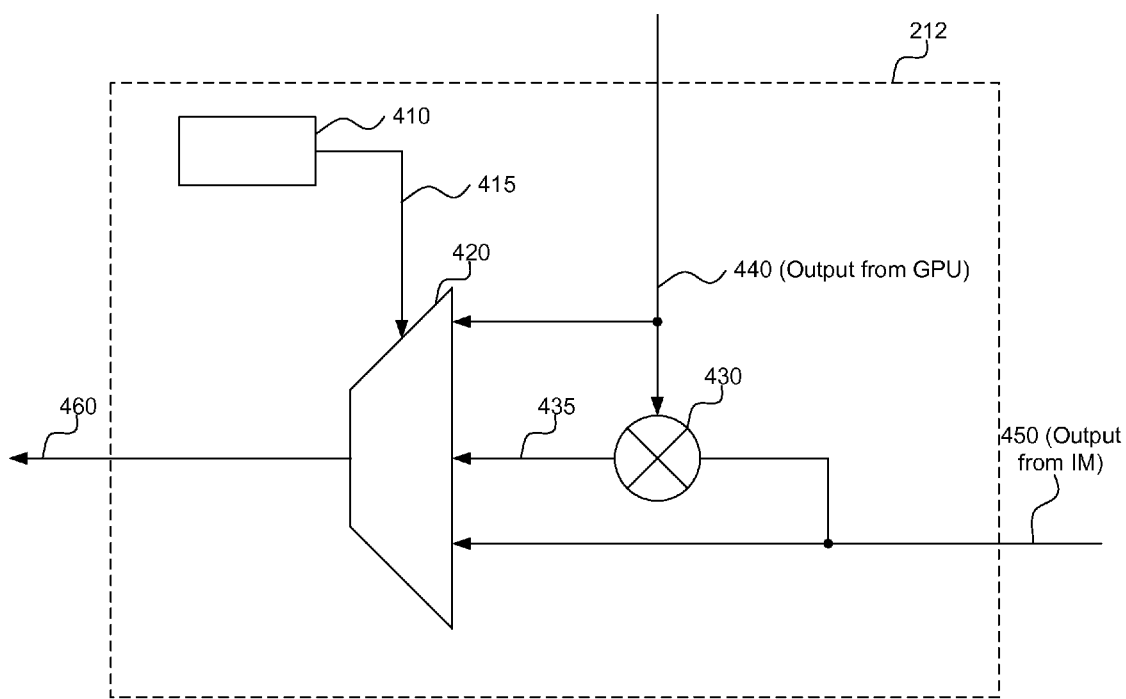
FIG. 4 is an illustration of an embodiment of a functional diagram of an interlink module.

In reference to FIG. 3, IMs $212_0$ and $212_1$ receive frames of graphics data 310 and 320, respectively, in which both outputs are in linear space. FIG. 4 is an illustration of an embodiment of a functional diagram of IM 212. Based on the description herein, a person skilled in the relevant art will recognize that the function of IM 212 can be performed using alternate circuit topologies. These alternate circuit topologies are within the scope and spirit of the present invention.

IM 212 includes a control device 410, a multiplexer 420, and a compositor device 430. In an embodiment, multiplexer 420 is configured to perform one of the following functions: (1) pass a GPU output 440 (e.g., frames of graphics data 310 and 320 of FIG. 3) to a multiplexer output 460; (2) pass a composite signal 435 to multiplexer output 460; or, (3) pass a signal 450 (e.g., signal 450 can be passed from another IM) to multiplexer output 460. Depending on a mode of operation of IM 212, control device 410 is configured to control the output of multiplexer 420 via a control signal 415.

For ease of explanation, IM 212 will be described using the first plurality of GPUs 210 of FIGS. 2 and 3. Based on the description herein, a person skilled in the relevant art will recognize that the function and operation of IM 212 can be applied to the second plurality of GPUs 220 of FIG. 2.

GPU output 440 can be, for example, frame of graphics data 310 of FIG. 3. Signal 450 can be, for example, frame of graphics data 320 of FIG. 3, which is passed from IM $212_1$ to IM $212_0$. Signal 450 can also be, for example, a merged frame of graphics data generated by another plurality of GPUs (e.g., the second plurality of GPUs 220 of FIG. 2). Further, composite signal 435 represents a merged frame of graphics data (e.g, composite frame of graphics data 330 of FIG. 3) generated by compositor device 430. Compositor device 430 is configured to receive GPU output 440 (e.g., frame of graphics data 310) and signal 450 (e.g., frame of graphics data 320) and to combine the two signals into composite signal 435.

In reference to FIG. 3, when passing frame of graphics data 320 from one IM to another IM for further processing, IM $212_1$ passes frame of graphics data 320 to IM $212_0$ via an IM output 340. This transfer operation of IM $212_1$ can be implemented with IM 212 of FIG. 4 according to an embodiment of the present invention. More specifically, according to an embodiment, multiplexer 420 passes GPU output 440 (which corresponds to frame of graphics data 320 of FIG. 3) to multiplexer output 460 (which corresponds to IM output 340). In this mode of operation, control device 410 controls multiplexer 420, via control signal 415, to pass GPU output 440 to multiplexer output 460. Multiplexer output 460 is passed to another IM (e.g., IM $212_0$ of FIG. 3) for further processing according to an embodiment.

In reference to FIG. 3, when merging the plurality of GPU outputs (e.g., frames of graphics data 310 and 320) to generate the merged frame of graphics data (e.g., composite frame of graphics data 330), IM $212_0$ receives IM output 340 (e.g., frame of graphics data 320) from IM $212_1$ and performs a compositing operation on the two GPU outputs. This compositing operation of IM $212_0$ can be implemented with IM 212 of FIG. 4 according to an embodiment of the present invention. More specifically, according to an embodiment, compositor device 430 receives GPU output 440 (e.g., frame of graphics data 310 of FIG. 3) and signal 450 (e.g., frame of graphics data 320 of FIG. 3) and performs a composite operation on the two GPU outputs to generate composite signal 435. In this mode operation, control device 410 controls multiplexer 420, via control signal 415, to pass composite signal 435 to multiplexer output 460. Multiplexer output 460 is then passed to a display (e.g., display 150 of FIG. 1) according to an embodiment.

For the third mode of operation of IM 212, signal 450 is passed to multiplexer output 460. In an embodiment, signal 450 represents a merged frame of graphics data generated by the second plurality of GPUs 220 of FIG. 2. In reference to FIG. 2, a merged frame of graphics data 225 from the second plurality of GPUs 220 can be generated in a similar manner as described above with respect to the first pluralities of GPUs 210. Once generated, merged frame of graphics data 225 can be passed to display 150 via IMs $212_1$ and $212_0$. This transfer operation of IMs $212_1$ and $212_0$ can be implemented with IM 212 of FIG. 4 according to an embodiment of the present invention. In particular, according to an embodiment, multiplexer 420 passes signal 450 (which corresponds to merged frame of graphics data 225) to multiplexer output 460. In this mode of operation, control device 410 controls multiplexer 420, via control signal 415, to pass signal 450 to multiplexer output 460. As a result, in reference to FIG. 2, IM $212_1$ passes merged frame of graphics data 225 to IM $212_0$, which then passes merged frame of graphics data 225 to display 150.

Based on the description herein, a person skilled in the relevant art will appreciate that the daisy-chain configuration of the first and second pluralities of GPUs 210 and 220 of FIG. 2 can be extended beyond two pluralities of GPUs. For instance, in a processing unit with three pluralities of GPUs, processing unit 140 of FIG. 2 can include a third plurality of GPUs connected between the second plurality of GPUs 220 and driver 130. In this exemplary configuration, the third plurality of GPUs can process a third merged frame of graphics data as the first and second pluralities of GPUs 210 and 220 process a first and second merged frame of graphics data, respectively. Similar to the description above, with respect to FIGS. 2-4, IMs in the third plurality of GPUs can pass the third merged from of graphics data to the second plurality of GPUs 220, which in turn passes the third merged frame of graphics data to the first plurality of GPUs 210. The first plurality of GPUs 210 then passes the third merged frame of graphics data to display 150. A person skilled in the relevant art will recognize that the above-described processing unit can be extended beyond three pluralities of GPUs.

Further, based on the description herein, a person skilled in the relevant art will appreciate that each plurality of GPUs (e.g., first plurality of GPUs 210 and second plurality of GPUs 220) can include more than two GPUs. For instance, the first plurality of GPUs 210 and the second plurality of GPUs can each contain three GPUs, where each plurality of GPUs can perform 3× sampling on a frame of graphics data. In turn, with this three-GPU configuration in each of the pluralities of GPUs, processing unit 140 of FIG. 2 can pass a composite frame of graphics data with 6× sampling to display 150. A person skilled in the relevant art will recognize that the above-described plurality of GPUs can be extended beyond three GPUs in each of the pluralities of GPUs.

In yet another example, based on the description herein, a person skilled in the relevant art will appreciate that the frame of graphics data processed by each of the pluralities of GPUs (e.g., first plurality of GPUs 210 and second plurality of GPUs 220 of FIG. 2) can be a portion of the frame of graphics data to be displayed (e.g., composite frame of graphics data 330). For instance, in reference to FIG. 2, the first plurality of GPUs 210 can perform an antialiasing operation on a "right" portion of the frame of graphics data to be displayed and the second plurality of GPUs 220 can perform an antialiasing operation on a "left" portion of the frame of graphics data to be displayed. In this example, IM $212_0$ can be used to merge the "right" and "left" portions of the graphics data to be displayed in a similar manner as described above with respect to the merge operation of IM 212 in FIG. 4. Once the merge operation is complete, the composite frame of graphics data (e.g., composite frame of graphics data 330) can be passed to display 150. A person skilled in the relevant art will recognize that the graphics frame to be displayed by processing unit 140 can be apportioned in other formats such as, for example, a "top" and "bottom" portion of the frame of graphics data to be displayed.

In summary, in reference to FIG. 3, IMs $212_0$ and $212_1$ can be used to execute a compositing operation on frames of graphics data 310 and 320, according to an embodiment of the present invention. IM $212_1$ is configured to pass frame of graphics data 320 to IM $212_0$, which executes the compositing operation and passes a composite frame of graphics data 330 to display 150. Composite frame of graphics data 330 illustrates how frames of graphics data 310 and 320 have been combined. In the example sampling patterns, frames of graphics data 310 and 320 are 2× multisampled, thus resulting in composite frame of graphics data 330 being 4× multisampled. The 4× multisampled composite frame of graphics data 330 results in improved video quality with a single pass through the video pipeline of graphics processing system 100 in FIG. 1.

In reference to FIG. 2, according to an embodiment, the second plurality of GPUs 220 functions in a similar manner as the first plurality of GPUs 210 described above with respect to FIG. 3. The second plurality of GPUs 220 performs antialiasing functions such as, for example, multisampling, supersampling, and a combination of multisampling and supersampling, in which IMs $222_0$ and $222_1$ operate in a similar manner as IMs $212_0$ and $212_1$ of the first plurality of GPUs 210, according to an embodiment of the present invention.

Multisampling is one of many antialiasing techniques that can be executed by the first and second pluralities of GPUs 210 and 220, respectively. Other antialiasing techniques such as, for example, supersampling can be executed by the first and second pluralities of GPUs 210 and 220, respectively. Alternatively, a combination of multisampling and supersampling operations can be executed by the first and second pluralities of GPUs 210 and 220, respectively. Further details on multisampling and supersampling, with respect to the first and second pluralities of GPUs 210 and 220, respectively, can be found in U.S. patent application Ser. No. 11/140,156, titled "Antialiasing System and Method," which is incorporated by reference herein in its entirety.

The following discussion focuses on the AFR features of the present invention. In reference to FIG. 2, processing unit 140 operates in a time division manner on a plurality of frames of graphics data according to an embodiment of the present invention. In an embodiment, the first plurality of GPUs 210 operates on odd video data frames (e.g., frame1, frame3, frame 5, etc.) and the second plurality of GPUs 220 operates on even video data frames (e.g., frame2, frame4, frame6, etc.). IMs $212_0$, $212_1$, $222_0$, and $222_1$ operate as links between the first and second pluralities of GPUs 210 and 220, respectively, according to an embodiment of the present invention. Based on the description herein, a person skilled in the relevant art will recognize that the first plurality of GPUs 210 can operate on even video data frames and that the second plurality of GPUs can operate on odd video data frames.

In an embodiment, the first plurality of GPUs 210 performs an antialiasing operation (e.g., compositing operation) on an odd video data frame of graphics data (e.g., frame1) to generate a merged odd video data frame. For instance, the first plurality of GPUs 210 performs a multisampling, a supersampling operation, or a combination of both multisampling and supersampling operations on the odd video data frame, as described above with respect to FIG. 3. Similarly, in an embodiment, the second plurality of GPUs 220 performs an antialiasing operation on an even video data frame of graphics data (e.g., frame2) to generate a merged even video data frame. The antialiasing operations on the odd and even video data frames by the first plurality of GPUs 210 and the second plurality of GPUs 220, respectively, occur substantially in parallel with one another according to an embodiment of the present invention.

After the first plurality of GPUs 210 completes its antialiasing operation to generate the merged odd video data frame, the merged odd video data frame is passed to a display (e.g., display 150 of FIG. 1). More specifically, in reference to FIG. 2, IM 212₁ passes an output from GPU 211₁ to IM 212₀, where IM 212₀ performs a compositing operation on the output from GPU 211₁ and an output from GPU 211₀ to generate the merged odd video data frame. The merged odd video data frame is then passed from IM 212₀ to display 150. IMs 212₀ and 212₁ operate in a similar manner as described above with respect to IM 212 of FIG. 4.

After the second plurality of GPUs 220 completes its antialiasing operation to generate the merged even video data frame, the merged even video data frame is passed to the first plurality of GPUs 210. More specifically, in reference to FIG. 2, IM 222₁ passes an output from GPU 221₁ to IM 222₀, where IM 222₀ performs a compositing operation on the output from GPU 221₁ and an output from GPU 221₀ to generate the merged even video data frame. After the merged odd video data frame is passed to display 150 via IM 212₀, the merged even video frame (e.g., merged frame of graphics data 225) is passed from the second plurality of GPUs 220 to the first plurality of GPUs 210. IM 212₁ receives the merged even video data frame from IM 222₀ and passes the merged even data frame to IM 212₀. The merged even video data frame is then passed from IM 212₀ to display 150. IMs 222₀ and 222₁ operate in a similar manner as described above with respect to IM 212 of FIG. 4.

According to an embodiment of the present invention, as the merged even video data frame is being passed to the display, the first plurality of GPUs 210 performs another antialiasing operation on the next odd video data frame (e.g., frame3) from the plurality of video data frames of graphics data. Likewise, in an embodiment, the second plurality of GPUs 220 performs another antialiasing operation on the next even video data frame (e.g., frame 4). This parallel graphics rendering technique of processing unit 140 (of FIG. 2) improves rendering performance of the graphics processing system (e.g., graphics processing system 100 of FIG. 1).

Figure 5:
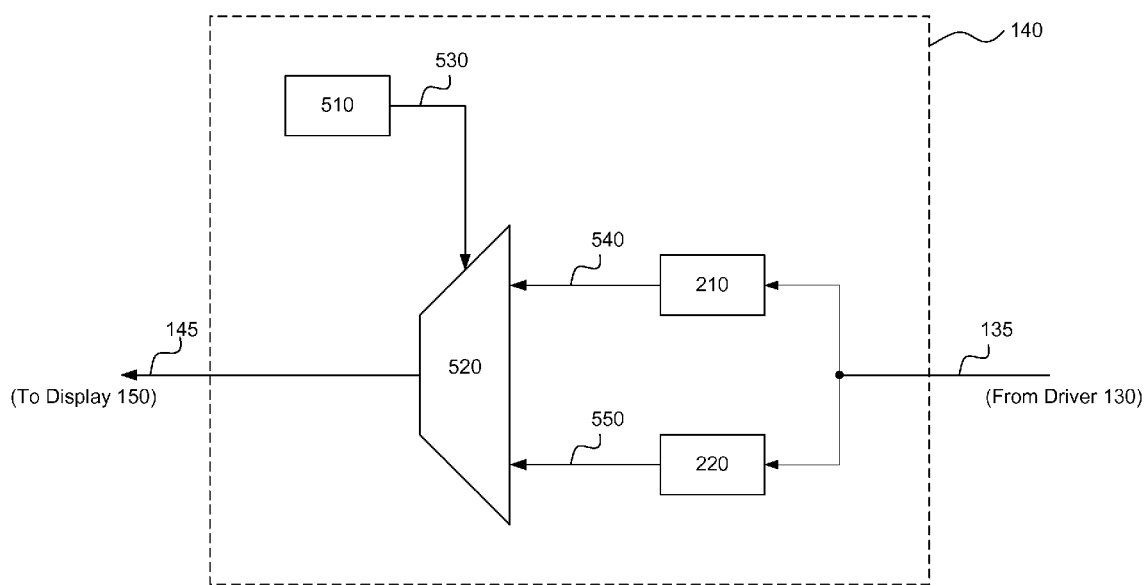
FIG. 5 is an illustration of another embodiment of a processing unit.

FIG. 5 is an illustration of another embodiment of processing unit 140. Processing unit 140 includes the first plurality of GPUs 210, the second plurality of GPUs 220, a control circuit 510, and a multiplexer 520. The first and second pluralities of GPUs 210 and 220 operate in a similar manner as described above with respect to FIG. 2. For ease of explanation, the first plurality of GPUs 210 performs an antialiasing operation on an odd video data frame and the second plurality of GPUs 220 performs an antialiasing operation on an even video data frame. Based on the description herein, a person skilled in the relevant art will recognize that the first plurality of GPUs 210 can perform the antialiasing operation on the even video data frame and the second plurality of GPUs 220 can perform the antialiasing operation on the odd video data frame.

As a plurality of sequential frames of graphics data is passed to processing unit 140, the first plurality of GPUs 210 performs an antialiasing operation on the odd video data frames of graphics data (e.g., frame1, frame3, frame5, etc.) to generate a merged odd video data frame. Similarly, the second plurality of GPUs 220 performs an antialiasing operation on the even video data frames of graphics data (e.g., frame2, frame4, frame6, etc.) to generate a merged even video data frame. In an embodiment, the merged odd video data frame and the merged even video data frame are outputted onto signal outputs 540 and 550, respectively. In reference to FIG. 2, IMs 212₀, 212₁, 222₀, and 222₁ operate as links between driver output 135 and signal outputs 540 and 550 of FIG. 5.

In reference to FIG. 5, multiplexer 520 receives signal outputs 540 and 550, as well as a control signal 530 from control circuit 510, according to an embodiment. In an embodiment, control signal 530 controls multiplexer 520 to alternate the output of multiplexer 520 (e.g., processing unit output 145) between signal outputs 540 and 550, which represent a merged odd video data frame and a merged even video data frame, respectively. In particular, according to an embodiment, multiplexer 520 passes the merged odd video data frames and the merged even data frames in sequence (e.g., merged frame1, merged frame2, merged frame3, merged frame4, etc.) As the first plurality of GPUs 210 processes an odd video data frame and subsequently passes a merged odd video data frame to multiplexer 520, the second plurality of GPUs 220 receives an even video data frame from driver output 135. In turn, the first plurality of GPUs 210 receives another odd video data frame from driver output 135 as the second plurality of GPUs processes the even video data frame and subsequently passes a merged even video data frame to multiplexer 520. This parallel graphics rendering technique of processing unit 140 (of FIG. 5) improves rendering performance of the graphics processing system (e.g., graphics processing system 100 of FIG. 1).

Figure 6:
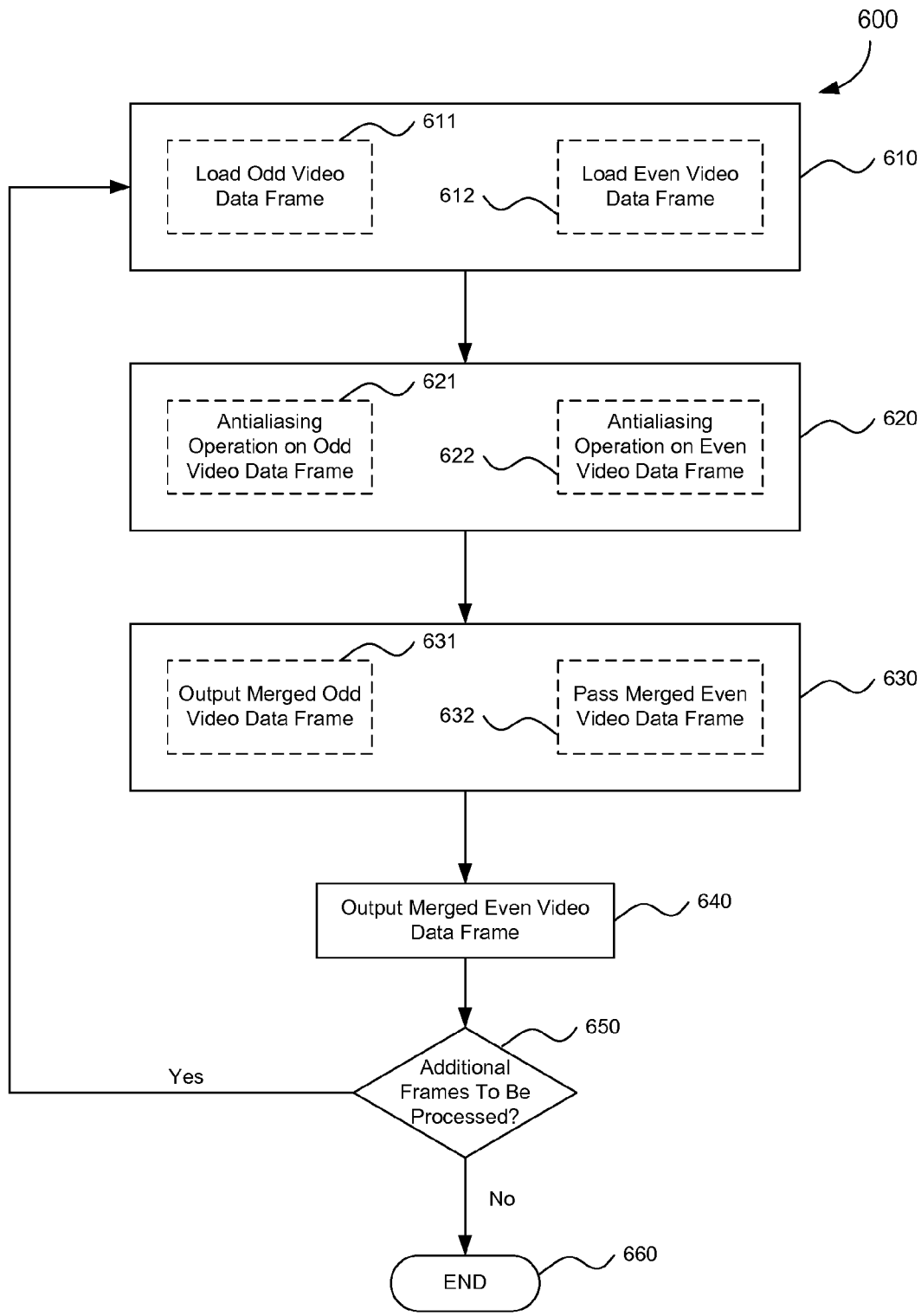
FIG. 6 is an illustration of an embodiment of a method for processing a plurality of frames of graphics data.

FIG. 6 is an illustration of an embodiment of a method 600 for processing a plurality of frames of graphics data. The steps of method 600 can occur, for example, using processing unit 140 of FIG. 2.

Step 610 is divided into two operations—steps 611 and 612—that can occur substantially in parallel with one another, according to an embodiment. In step 611, an odd video data frame (e.g., frame1) is loaded into a first plurality of GPUs (e.g., first plurality of GPUs 210 of FIG. 2). In step 612, an even video data frame (e.g., frame2) is loaded into a second plurality of GPUs (e.g., second plurality of GPUs 220 of FIG. 2). In another embodiment, steps 611 and 612 can occur in a sequential manner. For instance, step 611 can occur first, followed by step 612—or, vice versa.

Step 620 is divided into two operations—steps 621 and 622—that can occur substantially in parallel with one another, according to an embodiment. In step 621, an antialiasing operation is performed on the odd video data frame by the first plurality of GPUs to generate a merged odd video data frame. Similarly, in step 622, an antialiasing operation is performed on the even video data frame by the second plurality of GPUs to generate a merged even video data frame. In an embodiment, the antialiasing operation can be a multisampling operation, a supersampling operation, or a combination of both multisampling and supersampling operations as described above with respect to FIG. 3. In another embodiment, steps 621 and 622 can occur in a sequential manner, in which step 621 can occur first, followed by step 622—or, vice versa.

Step 630 is divided into two operations—steps 631 and 632—that can occur substantially in parallel with one another, according to an embodiment. In step 631, the merged odd video data frame (from step 621) is passed to a display (e.g., display 150 of FIG. 1). Compositor devices in the first plurality of GPUs (e.g., IMs $212_0$ and $212_1$ of FIG. 2) can be used to pass the merged odd video data frame to the display according to an embodiment of the present invention. In step 632, as the merged odd video data frame is being passed to the display, the merged even video data frame (from step 622) can be passed from the second plurality of GPUs (e.g., second plurality of GPUs 220 of FIG. 2) to the first plurality of GPUs (e.g., first plurality of GPUs 210 of FIG. 2). Compositor devices in the second plurality of GPUs (e.g., IMs $222_0$ and $222_1$ of FIG. 2) can be used to pass the merged even video data frame to the display according to an embodiment of the present invention. In another embodiment, steps 631 and 632 can occur in a sequential manner, where step 631 occurs first, followed by step 632.

In step 640, the merged even video data frame is passed from the first plurality of GPUs to the display. Similar to step 630, compositor devices in the first plurality of GPUs (e.g., IMs $212_0$ and $212_1$ of FIG. 2) can be used to pass the merged even video data frame to the display according to an embodiment of the present invention.

Step 650 assesses whether additional frames of graphics data need to be processed by the processing unit (e.g., processing unit 140 of FIG. 2). If so, steps 610-640 are repeated, in which the next frame of graphics data (e.g., frame3) corresponds to an odd video data frame and the subsequent frame of graphics data (e.g., frame4) corresponds to an even video data frame. A person skilled in the relevant art will recognize the alternating manner in which method 600 processes a video stream consisting of a plurality of frames of graphics data. If there are no additional frames of graphics data to be processed by the processing unit, then method 600 is concluded at step 660.

Figure 7:
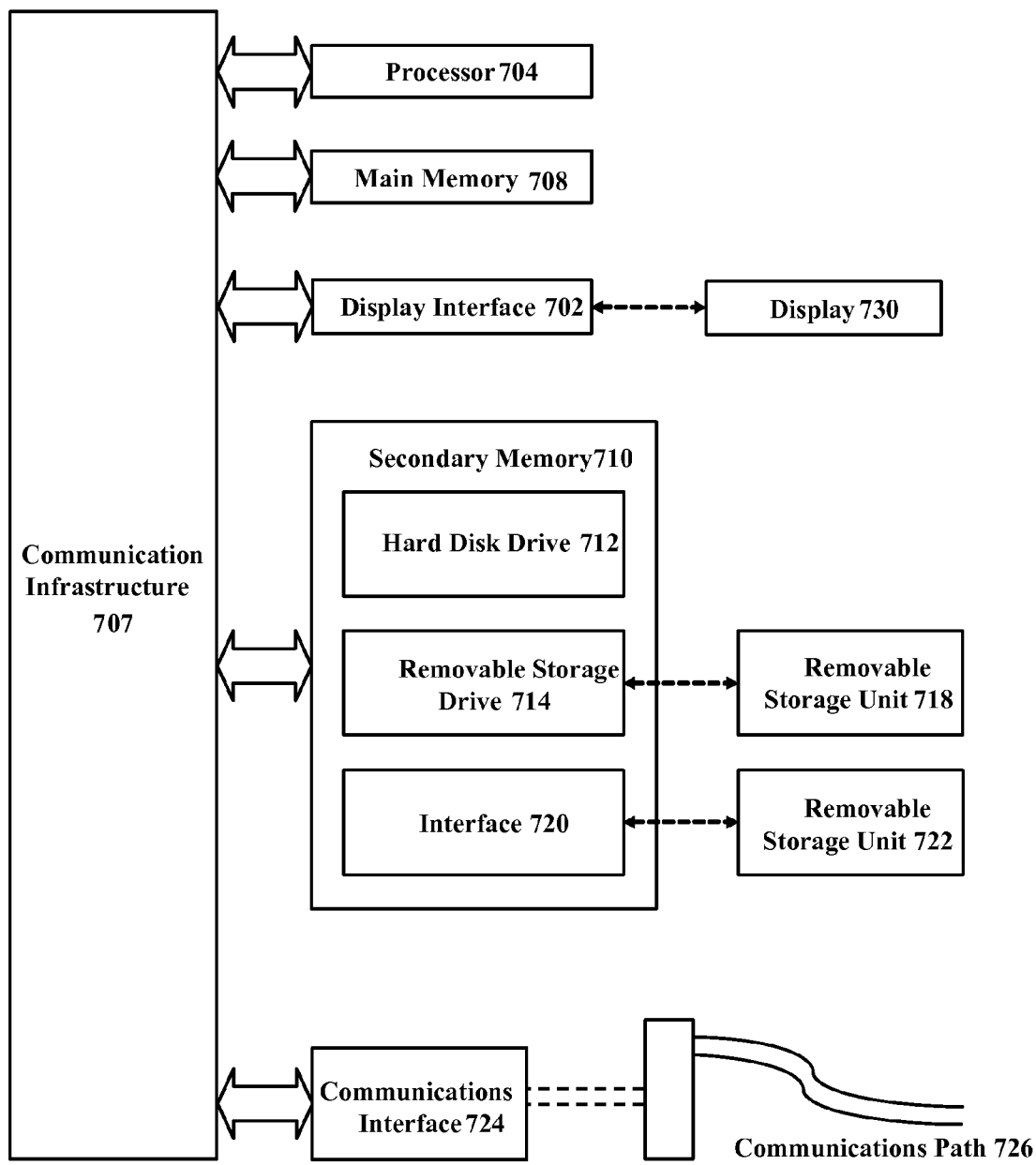
FIG. 7 is an illustration of an example computer system in which embodiments of the present invention can be implemented.

Various aspects of the present invention may be implemented in software, firmware, hardware, or a combination thereof. FIG. 7 is an illustration of an example computer system 700 in which embodiments of the present invention, or portions thereof, can be implemented as computer-readable code. For example, the methods illustrated by flowchart 600 of FIG. 6 can be implemented in system 700. Various embodiments of the present invention are described in terms of this example computer system 700. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (such as a GPU core) that is embodied in program code and can be transformed to hardware as part of the production of integrated circuits.

Computer system 700 includes one or more processors, such as processor 704. Processor 704 may be a special purpose or a general purpose processor (e.g., graphics processing unit). Processor 704 is connected to a communication infrastructure 706 (e.g., a bus or network).

Computer system 700 also includes a main memory 708, preferably random access memory (RAM), and may also include a secondary memory 710. Secondary memory 710 can include, for example, a hard disk drive 712, a removable storage drive 714, and/or a memory stick. Removable storage drive 714 can include a floppy disk drive, a magnetic tape drive, an optical disk drive, a flash memory, or the like. The removable storage drive 714 reads from and/or writes to a removable storage unit 718 in a well known manner. Removable storage unit 718 can comprise a floppy disk, magnetic tape, optical disk, etc. which is read by and written to by removable storage drive 714. As will be appreciated by persons skilled in the relevant art, removable storage unit 718 includes a computer-usable storage medium having stored therein computer software and/or data.

In alternative implementations, secondary memory 710 can include other similar devices for allowing computer programs or other instructions to be loaded into computer system 700. Such devices can include, for example, a removable storage unit 722 and an interface 720. Examples of such devices can include a program cartridge and cartridge interface (such as those found in video game devices), a removable memory chip (e.g., EPROM or PROM) and associated socket, and other removable storage units 722 and interfaces 720 which allow software and data to be transferred from the removable storage unit 722 to computer system 700.

Computer system 700 can also include a communications interface 724. Communications interface 724 allows software and data to be transferred between computer system 700 and external devices. Communications interface 724 can include a modem, a network interface (such as an Ethernet card), a communications port, a PCMCIA slot and card, or the like. Software and data transferred via communications interface 724 are in the form of signals, which may be electronic, electromagnetic, optical, or other signals capable of being received by communications interface 724. These signals are provided to communications interface 724 via a communications path 726. Communications path 726 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 718, removable storage unit 722, and a hard disk installed in hard disk drive 712. Computer program medium and computer-usable medium can also refer to memories, such as main memory 708 and secondary memory 710, which can be memory semiconductors (e.g., DRAMs, etc.). These computer program products provide software to computer system 700.

Computer programs (also called computer control logic) are stored in main memory 708 and/or secondary memory 710. Computer programs may also be received via communications interface 724. Such computer programs, when executed, enable computer system 700 to implement embodiments of the present invention as discussed herein. In particular, the computer programs, when executed, enable processor 704 to implement processes of embodiments of the present invention, such as the steps in the methods illustrated by flowchart 600 of FIG. 6, discussed above. Accordingly, such computer programs represent controllers of the computer system 700. Where embodiments of the present invention are implemented using software, the software can be stored in a computer program product and loaded into computer system 700 using removable storage drive 714, interface 720, hard drive 712 or communications interface 724.

Embodiments of the present invention are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by persons skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A processing unit, comprising:
   a first plurality of graphics processing units (GPUs), wherein each GPU within the first plurality is configured to output at least a portion of a first frame of graphics data;
   a first plurality of interlink modules, wherein each interlink module of the first plurality of interlink modules is coupled to a respective GPU of the first plurality of GPUs:
   a second plurality of GPUs, wherein each GPU within the second plurality is configured to output at least a portion of a second frame of graphics data; and
   a second plurality of interlink modules, wherein each interlink module of the second plurality of interlink modules is coupled to a respective GPU of the second plurality of GPUs,
   wherein at least one interlink module of the first plurality of interlink modules is configured to selectively pass its corresponding portion of the first frame of graphics data to another interlink module of the first plurality of interlink modules and further configured to selectively receive the second frame of graphics data from the second plurality of interlink modules, merge the second frame of graphics data with its corresponding portion of the first frame of graphics data, and pass the merged graphics data.

2. The processing unit of claim 1, further comprising:
   a third plurality of GPUs configured to output a third frame of graphics data;
   wherein each GPU is respectively coupled to an interlink module of a third plurality of interlink modules and cooperatively arranged to process and pass the third frame of graphics data to the first and second plurality of interlink modules.

3. The processing unit of claim 1, wherein the first plurality of GPUs is configured to output the first frame of graphics data substantially in parallel as the second plurality of GPUs outputs the second frame of graphics data.

4. The processing unit of claim 1, wherein the first plurality of GPUs is configured to perform a first antialiasing operation on the first frame of graphics data and the second plurality of GPUs is configured to perform a second antialiasing operation on the second frame of data.

5. The processing unit of claim 1, wherein the interlink modules corresponding to the first plurality of GPUs are configured to pass a respective GPU output from the first plurality of GPUs to another interlink module for further processing or for display on, the display module.

6. The processing unit of claim 1, wherein the interlink modules corresponding to the second plurality of GPUs are configured to a respective GPU output from the second plurality of GPUs to another interlink module for further processing.

7. The processing unit of claim 1, wherein the first plurality of interlink modules is configured to at least one of pass a merged first frame of graphics data to the display module and pass a merged second frame of graphics data to the display module.

8. The processing unit of claim 7, wherein a first interlink module corresponding to a first GPU in the second plurality of GPUs is configured to pass the merged second frame of graphics data to a second interlink module corresponding to a second GPU in the first plurality of GPUs.

9. The processing unit of claim 1, wherein the first and second plurality of interlink modules are configured to pass the first and second frames of graphics data to the display module in sequence.

10. A method for processing a plurality of frames of graphics data, comprising:
    outputting a first frame of graphics data from a first plurality of graphics processing units (GPUs), wherein a first antialiasing operation is performed on the first frame of graphics data, and further wherein, each GPU within the first plurality is configured to output at least a portion of the first frame of graphics data;
    outputting a second frame of graphics data from a second plurality of GPUs, wherein a second antialiasing operation is performed on the second frame of graphics data; and further wherein each GPU within the second plurality is configured to output at least a portion of the second frame of graphics data; and
    processing and passing the first and second frames of graphics data to a display module with a first and second plurality of interlink modules coupled to a respective GPU from the first and second plurality of GPUs,
    wherein at least one interlink module of the first plurality of interlink modules is configured to selectively pass its corresponding portion of the first frame of graphics data to another interlink module of the first plurality of interlink modules and further configured to selectively receive the second frame of graphics data from the second plurality of interlink modules, merge the second frame of graphics data with its corresponding portion of the first frame of graphics data, and pass the merged graphics data.

11. The method of claim 10, further comprising:
    outputting a third frame of graphics data with the first plurality of GPUs after the first frame of graphics data is passed to the display module, wherein a third antialiasing operation is performed on the third frame of graphics data;

outputting a fourth frame of graphics data with the second plurality of GPUs after the second frame of graphics data is passed to the display module, wherein a fourth antialiasing operation is performed on the fourth frame of graphics data; and processing and passing the third and fourth frames of graphics data to the display module via the first and second plurality of interlink modules.

12. The method of claim 10, wherein outputting the first frame of graphics data comprises outputting the first frame of graphics data substantially in parallel with the outputting of the second frame of graphics data.

13. The method of claim 10, wherein outputting the first frame of graphics data comprises combining an output from each GPU in the first plurality of GPUs with the first plurality of interlink modules.

14. The method of claim 10, wherein outputting the second frame of graphics data comprises combining an output from each GPU in the second plurality of GPUs with the second plurality of interlink modules.

15. The method of claim 10, wherein processing and passing comprises passing the processed first frame of graphics data to the display module followed by passing the processed second frame of graphics data to the display module.

16. The method of claim 15, wherein passing the processed second frame of graphics data comprises passing the processed second frame of graphics data from a first interlink module corresponding to a first GPU in the second plurality of GPUs to a second interlink module corresponding to a second GPU in the first plurality of GPUs.

17. A graphics processing system, comprising:
an application module;
an application programming interface (API) configured to receive one or more commands from the application module;
a driver module configured to translate the one or more commands from the API into a native format;
a processing unit configured to process a plurality of frames of graphics data based on the one or more commands translated by the driver module, wherein the processing unit comprises:

a first plurality of graphics processing units (GPUs), wherein each GPU within the first plurality is configured to output at least a portion of a first frame of graphics data, a first plurality of interlink modules, wherein each interlink module of the first plurality of interlink modules is coupled to a respective GPU of the first plurality of GPUs, a second plurality of GPUs, wherein each GPU within the second plurality is configured to output at least a portion of a second frame of graphics data, and a second plurality of interlink modules, wherein each interlink module of the second plurality of interlink modules is coupled to a respective GPU of the second plurality of GPUs, wherein at least one interlink module of the first plurality of interlink modules is configured to selectively pass its corresponding portion of the first frame of graphics data to another interlink module of the first plurality of interlink modules and further configured to selectively receive the second frame of graphics data from the second plurality of interlink modules, merge the second frame of graphics data with its corresponding portion of the first frame of graphics data, and pass the merged graphics data; and a display module configured to receive the first and second processed frames of graphics data from the processing unit.

18. The graphics processing system of claim 17, wherein the driver module is configured to enable the API to adjust settings of the processing unit.

19. The graphics processing system of claim 18, wherein the settings of the processing unit comprises multisampling factors, supersampling factors, and a combination of multisampling and supersampling factors.

20. The graphics processing system of claim 17, wherein the processing unit is configured to perform an antialiasing operation on the plurality of frames of graphics data.

21. The graphics processing system of claim 17, wherein the processing unit is configured to perform an alternate frame rendering operation on the plurality frames of graphics data.

22. The graphics processing system of claim 17, wherein the display module is configured to sequentially display the first and second merged frames of graphics data to an end user.

* * * * *

UNITED STATES PATENT AND TRADEMARK OFFICE
CERTIFICATE OF CORRECTION

| | | |
|---|---|---|
| PATENT NO. | : 8,217,950 B2 | Page 1 of 1 |
| APPLICATION NO. | : 12/552759 | |
| DATED | : July 10, 2012 | |
| INVENTOR(S) | : Koduri et al. | |

It is certified that error appears in the above-identified patent and that said Letters Patent is hereby corrected as shown below:

Column 14
Line 17, Claim 5, please replace "on, the display" with --on the display--.

Column 14
Line 42, Claim 10, please replace "wherein, each GPU" with --wherein each GPU--.

Signed and Sealed this
Twenty-eighth Day of August, 2012

David J. Kappos
*Director of the United States Patent and Trademark Office*